United States Patent [19]

Hedlund

[11] Patent Number: 4,669,605
[45] Date of Patent: Jun. 2, 1987

[54] CONVEYING SYSTEM

[75] Inventor: David S. Hedlund, Minnetonka, Minn.

[73] Assignee: Cargill, Incorporated, Minnetonka, Minn.

[21] Appl. No.: 711,033

[22] Filed: Mar. 12, 1985

[51] Int. Cl.[4] ............................................. B65G 47/18
[52] U.S. Cl. .............................. 198/540; 198/550.01; 198/747
[58] Field of Search ............... 198/747, 736, 749, 540, 198/550.01; 417/900, 551; 92/178

[56] References Cited

U.S. PATENT DOCUMENTS 3,327,593 6/1967 Ciaccia ..................................... 92/178
4,406,220 9/1983 Bergman .............................. 198/747

FOREIGN PATENT DOCUMENTS 1262946 3/1968 Fed. Rep. of Germany ...... 198/736
185606 9/1922 United Kingdom ................ 198/747
304963 1/1929 United Kingdom ................ 198/747

Primary Examiner—Joseph E. Valenza
Attorney, Agent, or Firm—Fitch, Even, Tabin & Flannery

[57] ABSTRACT

A conveying system particularly for solid municipal waste to be subjected to air classification as provided which comprises a ram tube conveyor. The ram tube conveyor includes a cylindrical casing connected at its forward end to an outwardly tapered tube and a feeder hopper at the forward end of the casing. Hydraulically activated ram supported upon wheels closes the bottom of the feeder hopper during its operation and pushes material from the feeder hopper into the tapered tube. The tapered tube is proportioned to compress the materials and the ram serves to self clean the ram tube conveyor.

14 Claims, 4 Drawing Figures

CONVEYING SYSTEM

The present invention relates generally to a conveying system, and more particularly, it relates to a ram tube conveyor adapted for handling of solid municipal waste.

Various devices and systems are known for handling bulky compressible materials which are to be delivered for further processing or handling. Open conveyor belts, of course, can move bulky compressible materials but the materials do not particularly lend themselves to this method of transport because of their inherent nature, and such belts do not serve to consolidate the materials for further processing and handling.

The bulky compressible materials can be aggregated by pushing and moving, as with tractor blades, but this method requires high labor costs and particular equipment, and does not provide uniformity in the aggregated materials.

The problem of handling bulky compressible materials particularly occurs with respect to solid municipal waste which has heterogeneous characterisitcs and which needs further processing. A highly effective system for effectively separating solid municipal waste is disclosed in U.S. Pat. Nos. 4,070,202 and 4,178,232, which system comprises a rotary air classifying apparatus. Delivery to such apparatus, for most effective operation, requires that the solid municipal waste be consolidated without being overly compressed, whereby the waste is effectively delivered and can be efficiently dispersed for air classification.

Small refuse handling systems have been developed, as for example the system shown in U.S. Pat. No. 4,406,220 to Bergman. However, this system is primarily adapted for light waste encountered in tenement buildings and is particularly designed to highly compress the waste and transport it over extended distances. The system shown in this patent tends to clog or block, and is not particularly effective for the handling of solid municipal waste.

U.S. Pat. No. 3,802,337 to St-Hilaire and U.S. Pat. No. 3,815,323 to Longo disclose rams which push refuse through restricting or converging channels which tend to clog or block, and are not satisfactory for conveying solid municipal waste.

In U.S. Pat. No. 4,178,232 to Nollet, there is shown a feeding system to an effective drum air classifier apparatus but this method of using an open belt for feeding the drum has not proved to provide the best results in connection with the handling of solid municipal waste. Similarly, pan conveyor, shaker conveyor, drop chute or pneumatic conveyor are not successful for feeding the air classifier drum. More particularly, a pneumatic conveyor must be ruled out because it would inject the material too far into the drum. A shaker conveyor requires substantial support structure and would not be satisfactory for use in connection with an air classifier drum. Further, a pan conveyor also requires substantial support structure and does not work effectively in an air classifier drum. The use of a gravity chute feed is not satisfactory because unprocessed solid municipal waste flows poorly and tends to cause a plug problem so that a gravity chute feed is not to be used.

The principal object of this invention is to provide an improved conveying system, and particularly to provide such a system for effective feeding of an air classification drum.

A further object of the invention is to provide an improved ram tube conveyor.

A still further object of this invention is to provide an improved ram tube conveyor which can effectively handle solid municipal waste which has not been processed.

Another object of the invention is to provide a ram tube conveyor particularly adapted for the handling of solid municipal waste which does not clog and provides an improved feed for an air classification drum.

DRAWINGS

GENERAL DESCRIPTION OF THE INVENTION

Figure 1:
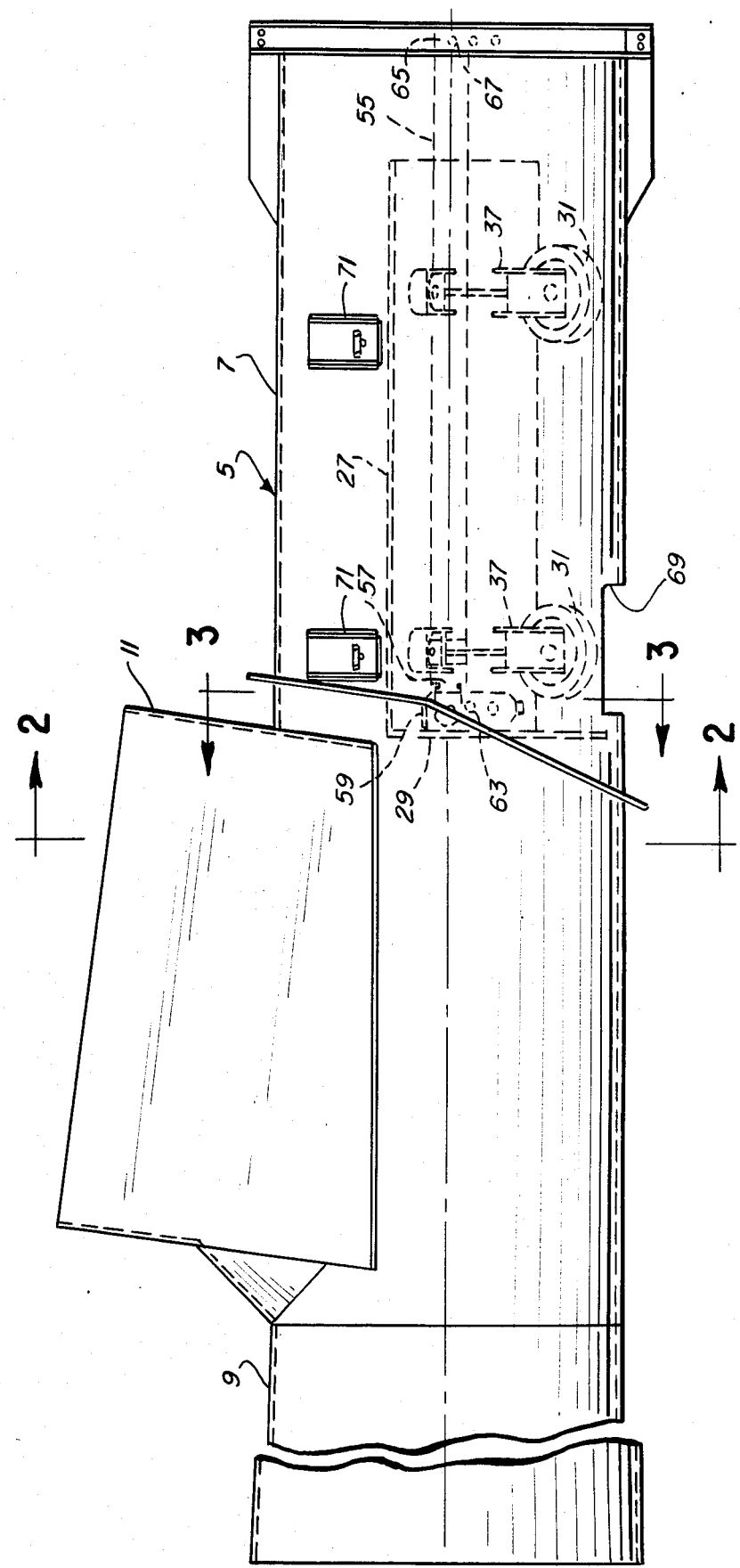
FIG. 1 is a side view of the ram tube conveyor of the invention, with the ram means being shown dotted in the drawing.
Figure 2:
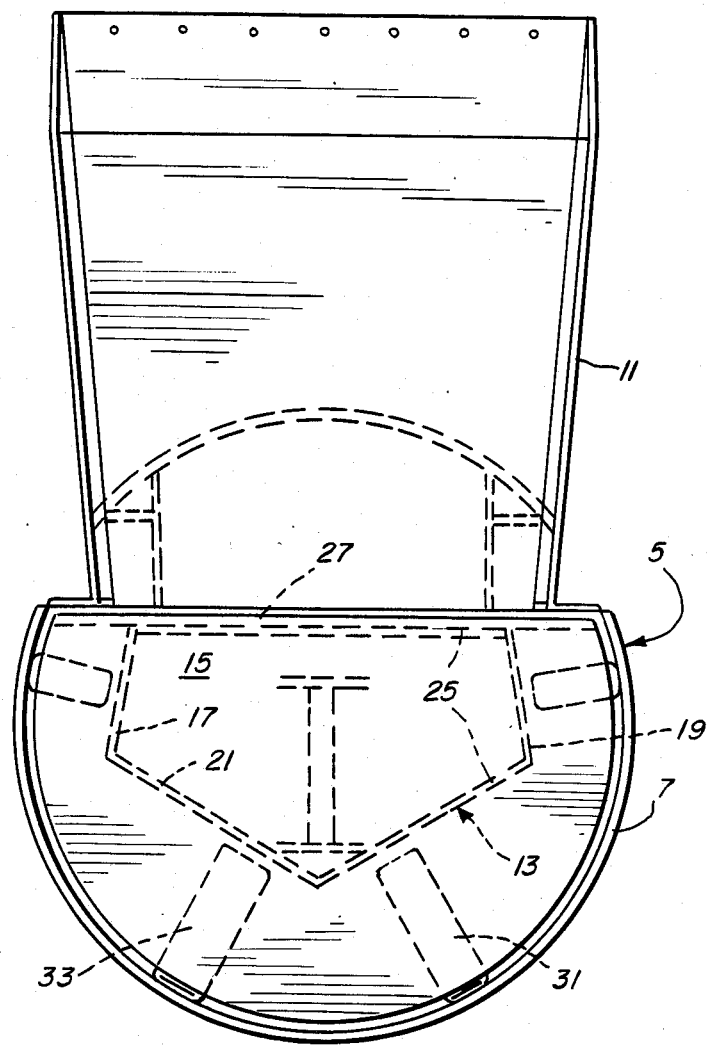
FIG. 2 is an end view of the ram tube conveyor taken along lines 2—2 in FIG. 1.
Figure 3:
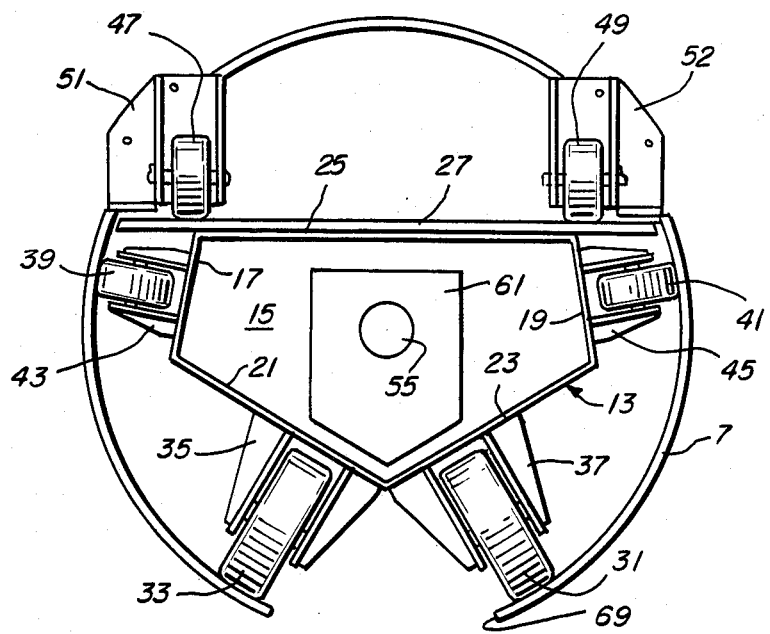
FIG. 3 is also an end view of the conveyor with the view being taken along lines 3—3 in FIG. 1.
Figure 4:
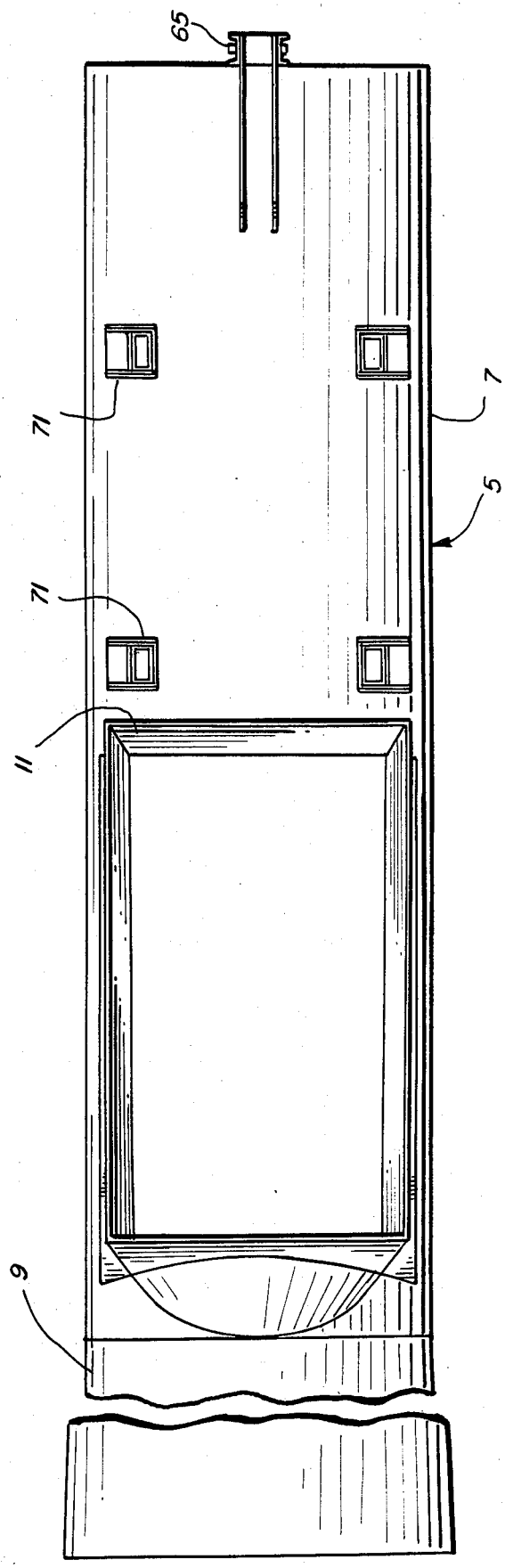
FIG. 4 is a top view of the ram tube conveyor of the invention.

The conveying system of the invention is particularly adapted for use in connection with an air classification system such as that shown in U.S. Pat. Nos. 3,802,337 to Nollet and 3,815,328 also to Nollet. The conveying system of the invention includes a ram tube conveyor 5 which generally comprises a cylindrical casing 7. At its forward end, the cylindrical casing 7 connects to an outwardly tapered compressing tube 9 which extends forwardly a distance sufficient to effect desired compression of the material which is fed to the conveying system.

A feeder hopper 11, which is generally rectangular in cross-section, extends upwardly from the cylindrical casing 7 and is positioned at the forward end of the casing. The feeder hopper 11 receives solid municipal waste in an unprocessed condition for charging into the forward end of the cylindrical casing 7. Disposed within the cylindrical casing 7 is a ram means 13.

The ram tube conveyor 5 thus basically comprises an integral arrangement including the cylindrical casing 7 in which is carried the ram means 13 and which connects at its forward end to the tapered tube 9 and also, adjacent to its forward end, to the hopper 11. The ram tube conveyor may extend into an air classification apparatus with suitable support, not shown, being provided.

It is important that the casing 7 be cylindrical in cross-section for the handling of solid municipal waste and for minimizing clogging and blocking during operation of the conveying system. Further, it is important that the casing be cylindrical for effective operation of the ram means 13. In other words, a square or rectangular cross-section for the ram tube conveyor 5 is to be avoided. The ram tube conveyor 5, because of its integral nature, can be appropriately mounted for positioning it in respect to various processing apparatus such as the rotary air classification system and various support means, not shown in the drawings, can be provided to accommodate the processing apparatus.

The tapered tube 9 is an important feature of the invention and requires an outward taper of between about 1 degree and 3 degrees in order to provide desired operation. If the tapered tube 9 is not outwardly tapered or is constricted, blockage occurs with solid municipal waste. If the taper is too great in extent, the desired compression of the waste is not achieved. The length of the tapered tube is also important to accommodate desired compression of the solid municipal waste and, the length of the tube should be at least 2 times its diameter and with proper feeding of the tapered tube can extend 8 times its diameter. Thus, the tapered tube 9 should have a length between about 2 and about 8 times its diameter.

The feeder hopper 11, as shown in FIG. 1, is slightly tilted for feeding or charging the cylindrical casing 7 at its forward end. However, the angle of tilt is not particularly important except that it be sufficiently vertical to effectively feed the solid municipal waste into the casing. The casing 7 is cut to accommodate the rectangular feeder hopper and welded into place. The feeder hopper 11, as shown, extends into the casing 7 about one-third of its diameter. The lower end of the feeder hopper 11 is generally rectangular in shape and is dimensioned so as to be closed off by the ram means 13 during its operation, as will be hereinafter pointed out.

The ram means 13 comprises a steel inner box frame 15 on which all of the components of the ram means are mounted. The box frame 15 is generally pentagonal in shape comprising a pair of rectangular, downwardly extending side panels 17 and 19 which connect to inwardly extending rectangular bottom panels 21 and 23, respectively. The side panels 17 and 19, at their upper end, connect to a top panel 25 on which may be bolted a closing plate 27 which serves to close off the bottom of the feeder hopper 11 as the ram means 13 moves forward and force the solid municipal waste in the forward section of the cylindrical casing 7 into the tapered tube 9. A pusher plate 29 is bolted or otherwise connected to the forward end of the box frame 15 and serves to function as the pushing means for the solid municipal waste. The pusher plate 29 generally conforms to the cross-section of the bottom of the casing 7 but has sufficient clearance for free movement. The closing plate 27 and pusher plate 29 are desirably bolted to the box frame 15 so that they can be readily removed because of wear and tear encountered in the handling of solid municipal waste.

The box frame 15 is supported and centered in the cylindrical casing by means of longitudinally spaced pairs of wheels 31 and 33 which are journaled on brackets 35 and 37 which are connected to the bottom panels 21 and 23 of the box frame 15. The pairs of wheels 31 and 33 on the box frame ride above the bottom on the interior of the cylindrical casing 7. Longitudinally spaced pairs of side wheels 39 and 41 are mounted on the side panels by means of similar brackets 43 and 45 to stabilize the box frame. The stabilizing pairs of side wheels 39 and 41 assure the provision of best results.

Pairs of guide wheels 47 and 49 are adjustably supported at the upper portion of the cylindrical casing 7 in longitudinally spaced relation. The guide wheels 47 and 49 ride on top of the closing plate 27 and serve to further guide the ram means 13 during its operation. Brackets 51 and 53 carry the guide wheels 47 and 49 and are vertically adjustable, as will be hereinafter more particularly described.

The ram means 13 is actuated by a hydraulic cylinder 55 having a piston 57 with a connecting means 59 at its forward end. The connecting means 59 is adjustably attached to a connecting plate 61 positioned on the rearward side of the pusher plate 29. The connecting plate 61 is provided with a series of vertically spaced holes 63 by means of which the piston 57 is connected at desired positions. The back end of the hydraulic cylinder 55 is connected to a mounting plate 65 disposed at the rearward end of the cylindrical casing 7. The mounting plate 65 is provided with vertically spaced holes 67 so that the position of the back end of the hydraulic cylinder 55 can be adjusted. Thus, the ram means 13 can be raised and lowered in the cylindrical casing 7 to provide adjustment for varying conditions.

A discharge opening 69 is located at the bottom of the casing 7 rearwardly of the pusher plate 29 when located in its rearwardmost position and is likewise rearwardly of the feeder hopper 11. The discharge opening 69 is sized to accommodate the solid municipal waste.

As shown in the drawings, the pairs of guide wheels 47 and 49 are supported for vertical adjustment by longitudinally spaced pairs of adjusting means 71 and 73 so that when the ram means 13 is raised or lowered on the connecting plate 61 and mounting plate 65, the pairs of guide wheels 47 and 49 may likewise be raised or lowered to accommodate movement of the hydraulic piston 57.

The hydraulic cylinder 55 is actuated by means of a source of hydraulic pressure (not shown) which serves to move the ram means 13 forwardly and rearwardly relative to the feeder hopper 11 in the cylindrical casing 7. As the ram means 13 moves forward, the closing plate 27 serves to block or cut off the charge from the feeder hopper 11 into the casing 7. Of course, as the ram means 13 moves rearwardly, the solid municipal waste further charges the casing 7. The ram means is repeatedly moved forwardly and rearwardly so as to fill the tapered tube 9 which, because of its taper, compresses but does not block operation of the ram tube conveyor 5. The length of the tapered tube 9, as before pointed out, is adjusted to effect light compression of the solid municipal waste for feeding into a rotary air classifier.

It will be seen that the support wheels 31 and 33 by reason of their attachment to the tapered bottom panels 21 and 23, are disposed so as to be positioned at an angle and do not ride on the bottom of the casing 7. The wheels 31 and 33 should be disposed at an angle of at least 15 degrees from the vertical and, of course, ride above the discharge opening 69 during longitudinal movement in the bottom of the cylindrical casing 7. However, the angle should not exceed 60 degrees. This positioning of the support wheels 31 and 33 serves to prevent the solid municipal waste from interfering with the free movement of the ram means 13.

As before pointed out, the pusher plate 29 is shaped to generally conform to the configuration of the interior of the cylindrical casing 7 but clears the bottom of the feeder hopper 11 and bottom of the casing 7. Any loose solid municipal waste which drops to the bottom of the casing is cleared by the lower end of the pusher plate 29 and pulled rearwardly for discharge through the opening 69. Accordingly, the ram tube conveyor 5 is self-cleaning resulting in more efficient operation.

In actual processing of solid municipal waste, the timing of the ram means 13 has been set to provide six strokes per minute with seven seconds of forward movement and three seconds for return movement. With a four foot diameter cylindrical casing 7, and a six foot stroke for the ram means 13, approximately 50 cubic feet of material is moved. If the density of the solid municipal waste is considered to be six pounds per cubic foot, the ram tube conveyor moves about 54 tons per hour. This provides highly effective feeding for a rotary classifier.

The various features of the invention which are believed to be new are set forth in the following claims:

What is claimed is:

1. A conveying system for handling compressible solid municipal waste materials comprising a ram tube conveyor including, in combination, a longitudinally extending cylindrical casing, an outwardly tapered tube connected at the forward end of said casing, said tapered tube having a length between about 2 to about 8 times the diameter of said tapered tube and an outward taper in the range of from about 1 to about 3 degrees, said taper being restricted to compress material in said tapered tube, a feeder hopper on said casing at its forward end and rearwardly of said tapered tube, said feeder hopper extending into said casing, a hydraulically actuated reciprocating ram means supported on the interior of said casing and moveable longitudinally from a position rearwardly of said feeder hopper to a position at the forward end of said feeder hopper, a discharge opening at the bottom of said casing and rearwardly of said feeder hopper, said ram means including support wheels which ride on said casing and which are disposed at an angle of at least 15 degrees from the vertical above said discharge opening.

2. A conveying system in accord with claim 1 wherein said feeder hopper has a rectangular cross section and extends into said casing and said ram means includes a closing plate proportioned to close the bottom of said feeder hopper when the ram means is in its forward position and a vertical pusher plate on the forward end of said ram means.

3. A conveying system in accord with claim 2 wherein the pusher plate has clearance from the cylindrical casing and the bottom of said feeder hopper, said pusher plate having a shape which conforms to the cross-section formed by the bottom of said cylindrical casing and the bottom of said feeder hopper.

4. A conveying system in accord with claim 1 further including vertically adjustable means for supporting said ram means, thereby permitting raising or lowering of said ram means.

5. A conveying system in accord with claim 2 wherein said support wheels are disposed at an angle of between about 15 degrees and about 30 degrees from the vertical.

6. A conveying system in accord with claim 1 wherein said ram means includes a pusher plate at the forward end thereof, said pusher plate conforming to the bottom of said casing whereby said pusher plate during rearward movement of said ram means self cleans the bottom of said casing by moving material to said discharge opening.

7. A conveying system comprising a ram tube conveyor including, in combination, a longitudinally extending cylindrical casing, a tube connected at the forward end of said casing, a feeder hopper on said casing at its forward end and rearwardly of said tube, a hydraulically actuated reciprocating ram means interior of said casing, a discharge opening at the bottom of said casing and rearwardly of said feeder hopper, said ram means having wheels which ride on said casing for support of said ram, said wheels being disposed at an angle of at least 15 degrees from the vertical and straddling said discharge opening.

8. A conveying system as recited in claim 7 wherein said tube is outwardly tapered.

9. A conveying system in accord with claim 8 wherein said feeder hopper has a rectangular cross section and extends into said casing and said ram means includes a closing plate proportioned to close the bottom of said feeder hopper when the ram means is in its forward position and a vertical pusher plate on the forward end of said ram means.

10. A conveying system in accord with claim 9 wherein the pusher plate has clearance from the cylindrical casing and the bottom of said feeder hopper, said pusher plate having a shape which conforms to the cross-section formed by the bottom of said cylindrical casing and the bottom of said feeder hopper.

11. A conveying system in accord with claim 9 further including vertically adjustable means for supporting said ram means, thereby permitting raising or lowering of said ram means.

12. A conveying system in accord with claim 9 wherein said support wheels are disposed at an angle or between about 15 degrees and about 30 degrees from the vertical.

13. A conveying system in accord with claim 9 wherein said tapered tube has a length between about 2 and about 8 times the diameter of said tube.

14. A conveying system in accord with claim 13 wherein said outward taper of said tube is in the range of from about 1 to about 3 degrees.

* * * * *